Patented Apr. 16, 1935

1,997,616

UNITED STATES PATENT OFFICE 1,997,616

JELLY MANUFACTURE

Leo Wallerstein, New York, N. Y., Julius Pfannmuller, North Plainfield, N. J., and Alfons Noë, New York, N. Y., assignors to Wallerstein Company, Inc., a corporation of New York No Drawing. Application July 18, 1933, Serial No. 680,981

7 Claims. (Cl. 99—11)

The present invention relates to the manufacture and production of jellies of enhanced jelly strength, and it particularly relates to new and improved pectin compositions for producing such jellies.

In utilizing solid and/or precipitated pectin products for the production of jellies, much difficulty has been encountered in obtaining uniform jellification and in the production of jellies of high jelly strength. Unless great care is taken, uneven jellification will take place, giving a jelly of unsatisfactory consistency and of undesirable strength, and frequently a cloudy and/or opaque jelly will often result.

An object of the present invention is to provide a solid jelly-forming mixture including pectin in subdivided form, which will, upon admixture with suitable amounts of water in heating, form a very high-grade jelly of commercial jelly strength and of uniform consistency.

Another object is to provide a jelly making process in which clear, transparent jellies of high strengths may be made by the addition of powdered, granulated or subdivided pectin compositions to water and/or fruit juices with suitable heating and without the necessity of exacting or stringent control to prevent the formation of cloudy products of little commercial value.

Other objects will be obvious and will appear during the course of the following specification.

It has been found that certain insoluble bases of alkali earth metals, in contradistinction to those of alkali metals, and particularly the carbonates, may be most satisfactorily employed in small amounts in solid or powdered pectin compositions to produce jellies of very high quality.

A desirable and satisfactory alkali earth carbonate for this purpose is magnesium carbonate, particularly in the form of its basic compounds. The normal carbonate, $MgCO_3$, may be employed, as may also the hydrated form thereof, $$MgCO_3.3H_2O.$$

The basic carbonates $$4MgCO_3.Mg(OH)_2.5H_2O$$

and $$3MgCO_3.Mg(OH)_2.3H_2O$$

may also be employed.

The insoluble carbonates of magnesium in small amounts lend themselves most desirably to intermixture with pectin preparations and appear to combine most efficaciously with the jelly and with the pectin preparation to produce the highgrade jelly. The magnesium carbonate is preferably utilized in the form of precipitated or powdered material of relatively high purity.

The pectin is most desirably obtained by treating apple pomace, beet waste, the skins of citrus fruits and other pectin containing materials with a dilute acid solution containing a mineral acid, such as hydrochloric acid, nitric acid and/or sulfuric acid, while maintaining the pH between 0.7 to 2.5 from 20 to 12 hours at temperatures ranging from 60 to 70 degrees C.

From the resultant pectous solution, the pectin may be precipitated by alcohol, calcium chloride and other precipitating agents and then dried and sub-divided or powdered. The preferred particle size of the powdered pectin should range from 80 to 100 mesh.

In forming the preferred composition of the present invention the powdered or sub-divided pectin or pectin preparation is thoroughly incorporated with a small amount of the powdered or sub-divided magnesium carbonate. Although the proportions may be widely varied the most satisfactory proportions are about 1 part of magnesium carbonate to 30 to 50 parts of pectin or pectin preparation with an optimum at about 40 parts.

In addition to the magnesium carbonate and the pectin, a suitable organic or fruit acid may be added and sugar may also be added. The fruit acid may be tartaric or citric and between 20 to 5 parts of pectin or pectin preparation may be utilized to each part of citric acid or tartaric. It has been found particularly satisfactory to utilize both tartaric and citric acid together and to also employ a relatively small quantity of cream or tartar.

For example, in one instance it was found satisfactory for commercial utilization to utilize about equal parts of tartaric and citric acids and a substantial large proportion of the cream of tartar so that these three components together would be present in amount equal to between ¼ and ½ the amount of pectin.

As stated above the precipitate pectin or calcium-pectin material is sub-divided or granulated so as to have a mesh range from about 80 to 100 while the magnesium carbonate, citric acid, tartaric acid and cream of tartar are most desirably utilized in powdered condition in a much finer state of subdivision than the pectin.

The following is a specific example of one composition according to the preferred embodiment of the present invention, to which the invention is by no means restricted.

10 grams pectin
   1.0 grams citric acid
   0.242 grams magnesium carbonate
   1.0 grams tartaric acid
   1.66 grams cream of tartar
   6.1 grams of anhydrous dextrose.

The above proportions may be considerably varied and the composition may be dissolved directly in the fruit juice or it may be dissolved in water and then added to the fruit juice. The anhydrous dextrose, which is sometimes known as cerelose, serves as the means of standardizing the composition and is preferably regulated so that about 1.5 parts by weight of the composition will make a good commercial jelly with 100 grams of sugar when the jelly-forming mixture or solution has a Brix of about 60 to 80 degrees.

This composition may then be added to fruit juice or water and the mixture may then be heated or boiled, preferably with slight stirring. The sugar may then be added and the boiling may be repeated. The jelly solution may be concentrated to any desirable Brix by boiling.

The following comparative table illustrates the remarkable advantages and improvement in jelly qualities obtainable with the pectin compositions of the present invention, as contrasted to mixtures which do not contain small amounts of magnesium.

In the following tabulation the jelly $a$ was made with the pectin composition.

Jelly $b$ was made with the above pectin composition but with the elemination of the citric acid and the magnesium carbonate content thereof.

Jelly $c$ was made with the above pectin composition in which sodium bicarbonate was utilized instead of magnesium.

| Jelly | Breaking strength grams | Cut | Clarity | Taste | Uniformity | pH |
|---|---|---|---|---|---|---|
| $a$ | 312 | Good | Good | Not very tart | Good | 3.3 |
| $b$ | 245 | Fair | Fair | Slightly tarter than $a$ | Lumps | 3.38 |
| $c$ | 224 | Fair | Fair | Tarter than $a$, $b$ | Better than $b$ but not fully satisfactory. | 3.35 |

It will be noted from the above table that the strength with pectin compositions above described containing very small amounts of magnesium carbonate is much greater than when it is not used or when a soluble carbonate, such as sodium bicarbonate is utilized. It will be noted that in jelly $c$ when sodium bicarbonate is utilized, although the uniformity is better than the case of jelly $b$, where no carbonate at all was utilized, nevertheless there was a substantial decrease in jelly strength. On the other hand, when magnesium carbonate is utilized, as in jelly $a$, both the jelly strength and the uniformity were greatly enhanced; the uniformity being much higher than in the case of a soluble carbonate, such as sodium bicarbonate.

In the formula specifically illustrated, the citric acid, the tartaric acid and the cream of tartar act as a buffer mixture to maintain a pH value of between about 3.0 to 3.4. The inclusion of citric acid, in addition to tartaric acid and cream of tartar, serves to assure greater clarity of the resulting jelly.

It is generally preferable to utilize a mixture of edible fruit acids, such as tartaric, citric, malic, and so forth, but if desired, one acid may be utilized by itself, as for example in the above formula, the tartaric acid might be replaced by additional quantities of citric.

Instead of cream of tartar as a buffer agent, the sodium, potassium, calcium and/or magnesium salts of edible organic acids might be employed.

We claim:—

1. A jelly making composition, capable of combining with sugar and water to form a firm edible fruit jelly of acid character, and capable of being stored for long periods of time without being affected by the atmosphere and without interreaction between its various components, such composition including pectin and magnesium carbonate.

2. A jelly making composition, capable of combining with sugar and water to form a firm edible fruit jelly of acid character, and capable of being stored for long periods of time without being affected by the atmosphere and without interreaction between its various components, such composition including pectin and magnesium carbonate in the proportion of about 20 parts by weight of the former to not more than 1 part by weight of the latter.

3. A jelly making composition, capable of combining with sugar and water to form a firm edible fruit jelly of acid character, and capable of being stored for long periods of time without being affected by the atmosphere and without interreaction between its various components, such composition including pectin, fruit acids and magnesium carbonate.

4. A jelly making composition, capable of combining with sugar and water to form a firm edible fruit jelly of acid character, and capable of being stored for long periods of time without being affected by the atmosphere and without interreaction between its various components, such composition including pectin, citric acid, magnesium carbonate, tartaric acid and cream of tartar.

5. A granulated or powdered jelly making composition, capable of combining with sugar and water to form a firm edible fruit jelly of acid character, and capable of being stored for long periods of time without being affected by the atmosphere and without interreaction between its various components, such composition including pectin, citric acid, magnesium carbonate, tartaric acid and cream of tartar in the respective proportions by weight of about 10 parts, 1 part, ¼ part, 1 part and 1½ parts.

6. A process of making an acidic jelly of high uniformity, clarity, and very high jelly strength, which comprises jellifying a mixture of pectin, magnesium carbonate, sugar and fruit acids.

7. An acidic jelly composition consisting of the combination of pectin, magnesium carbonate, fruit acids, sugar and water.

LEO WALLERSTEIN.
JULIUS PFANNMÜLLER.
ALFONS NOË.